United States Patent
Aberman et al.

(10) Patent No.: US 12,430,830 B2
(45) Date of Patent: Sep. 30, 2025

(54) PROMPT-TO-PROMPT IMAGE EDITING WITH CROSS-ATTENTION CONTROL

(71) Applicant: GOOGLE LLC, Mountain View, CA (US)

(72) Inventors: Kfir Aberman, San Mateo, CA (US); Amir Hertz, Tel Aviv (IL); Yael Pritch Knaan, Tel Aviv (IL); Ron Mokady, Tel Aviv (IL); Jay Tenenbaum, Tel Aviv (IL); Daniel Cohen-Or, Tel Aviv (IL)

(73) Assignee: GOOGLE LLC, Mountain View, CA (US)

(*) Notice: Subject to any disclaimer, the term of this patent is extended or adjusted under 35 U.S.C. 154(b) by 159 days.

(21) Appl. No.: 18/228,614

(22) Filed: Jul. 31, 2023

(65) Prior Publication Data

US 2024/0037822 A1    Feb. 1, 2024

Related U.S. Application Data

(60) Provisional application No. 63/394,187, filed on Aug. 1, 2022.

(51) Int. Cl.
*G06T 11/60*      (2006.01)
*G06F 3/04845*   (2022.01)
*G06F 40/40*      (2020.01)

(52) U.S. Cl.
CPC .......... *G06T 11/60* (2013.01); *G06F 3/04845* (2013.01); *G06F 40/40* (2020.01)

(58) Field of Classification Search
CPC .... G06T 11/001; G06T 11/60; G06F 3/04845; G06F 40/40
(Continued)

(56) References Cited

U.S. PATENT DOCUMENTS

2023/0095092 A1* 3/2023 Xiao ................. G06T 5/70
                                                                382/254
2023/0377226 A1* 11/2023 Saharia ............. G06V 10/82
(Continued)

FOREIGN PATENT DOCUMENTS

WO    WO-2023225344 A1 * 11/2023 ........... G06F 40/284

OTHER PUBLICATIONS

Wang, Jianan, et al. "Manitrans: Entity-level text-guided image manipulation via token-wise semantic alignment and generation." Proceedings of the IEEE/CVF conference on computer vision and pattern recognition. Jun. 2022, pp. 10697-10707. (Year: 2022).*
(Continued)

*Primary Examiner* — James S Wozniak
(74) *Attorney, Agent, or Firm* — Gray Ice Higdon

(57) ABSTRACT

Some implementations are directed to editing a source image, where the source image is one generated based on processing a source natural language (NL) prompt using a Large-scale language-image (LLI) model. Those implementations edit the source image based on user interface input that indicates an edit to the source NL prompt, and optionally independent of any user interface input that specifies a mask in the source image and/or independent of any other user interface input. Some implementations of the present disclosure are additionally or alternatively directed to applying prompt-to-prompt editing techniques to editing a source image that is one generated based on a real image, and that approximates the real image.

20 Claims, 5 Drawing Sheets

(58) Field of Classification Search
USPC .......................................................... 704/9
See application file for complete search history.

(56) References Cited

U.S. PATENT DOCUMENTS

2024/0005604 A1* 1/2024 Kreis ...................... G06T 19/20
2024/0135611 A1* 4/2024 Costin ..................... G06T 11/60

OTHER PUBLICATIONS

Wu, Chen Henry, and Fernando De la Torre. "Making Text-to-Image Diffusion Models Zero-Shot Image-to-Image Editors by Inferring "Random Seeds"." NeurIPS 2022 Workshop on Score-Based Methods, Nov. 2022, pp. 1-7. (Year: 2022).*
Brock, A. et al., "Large Scale GAN Training For High Fidelity Natural Image Synthesis;" Cornell University, arXiv.org. arXiv:1809.11096v1; 29 pages; Sep. 28, 2018.
Goodfellow, I. et al., "Generative Adversarial Nets;" In Advances in Neural Information Processing Systems; 9 pages; dated 2014.
Radford et al., "Learning Transferable Visual Models From Natural Language Supervision" arXiv:2103.00020v1 [cs.CV] 48 pages, dated Feb. 26, 2021.
Vaswani, A. et al. "Attention Is All You Need." Advances in Neural Information Processing Systems 30 (NIPS 2017), 11 pages; dated 2017.
Abdal, R. et al., "Image2StyleGAN: How to Embed Images Into the StyleGAN Latent Space?"; In Proceedings of the IEEE/CVF International Conference on Computer Vision; pp. 4432-4441; dated 2019.
Abdal, R. et al., "CLIP2StyleGAN: Unsupervised Extraction of StyleGAN Edit Directions"; arXiv.org; arXiv:2112.05219v1; 17 pages; dated Dec. 9, 2021.
Alaluf, Y. et al., "HyperStyle: StyleGAN Inversion with HyperNetworks for Real Image Editing"; In Proceedings of the IEEE/CVF Conference on Computer Vision and Pattern Recognition; pp. 18511-18521; dated 2022.
Avrahami, O. et al., "Blended Latent Diffusion"; arXiv.org; arXiv:2206.02779v1; 20 pages; dated Jun. 6, 2022.
Avrahami, Omri et al., "Blended diffusion for text-driven editing of natural images"; In Proceedings of the IEEE/CVF Conference on Computer Vision and Pattern Recognition; pp. 18208-18218; dated 2022.
Bar-Tal, O. et al., "Text2LIVE: Text-Driven Layered Image and Video Editing"; arXiv.org; arXiv:2204.02491v2; 21 pages; dated May 25, 2022.
Bau, D. et al., "Paint by Word"; arXiv.org; arXiv:2103.10951v2; 10 pages; dated Mar. 24, 2021.
Crowson, K. et al., "VQGAN-Clip: Open Domain Image Generation and Editing with Natural Language Guidance"; arXiv.org; arXiv:2204.08583v2; 32 pages; dated Sep. 4, 2022.
Dhariwal, P. et al., "Diffusion Models Beat GANs on Image Synthesis"; Advances in Neural Information Processing Systems; 15 pages; dated 2021.
Ding, M. et al., "CogView: Mastering Text-to-Image Generation via Transformers"; Advances in Neural Information Processing Systems; 14 pages; dated 2021.
Esser, P. et al., "Taming Transformers for High-Resolution Image Synthesis"; In Proceedings of the IEEE/CVF Conference on Computer Vision and Pattern Recognition; pp. 12873-12883; dated 2021.
Gafni, O. et al., "Make-A-Scene: Scene-Based Text-To-Image Generation with Human Priors"; arXiv.org; arXiv:2203.13131v1; 17 pages; dated Mar. 24, 2022.
Gal, R. et al, "StyleGAN-NADA: CLIP-Guided Domain Adaptation of Image Generators"; arXiv.org; arXiv:2108.00946v2; dated Dec. 16, 2021.
Hinz, T. et al., "Semantic Object Accuracy for Generative Text-To-Image Synthesis"; IEEE Transactions on Pattern Analysis and Machine Intelligence; dated 2020.

Ho, J. et al., "Denoising Diffusion Probabilistic Models"; Advances in Neural Information Processing Systems; 12 pages; dated 2020.
Ho, J. et al., "Classifier-Free Diffusion Guidance"; In NeurIPS 2021 Workshop on Deep Generative Models and Downstream Applications; 8 pages; dated 2021.
Karras, T. et al., "Alias-Free Generative Adversarial Networks"; Advances in Neural Information Processing Systems; 12 pages; dated 2021.
Karras, T. et al., "A Style-Based Generator Architecture for Generative Adversarial Networks"; In Proceedings of the IEEE Conference on Computer Vision and Pattern Recognition; pp. 4401-4410; dated 2019.
Karras, T. et al, "Analyzing and Improving the Image Quality of StyleGAN"; In Proceedings of the IEEE/CVF Conference on Computer Vision and Pattern Recognition; pp. 8110-8119; dated 2020.
Kim, G. et al, "DiffusionCLIP: Text-Guided Diffusion Models for Robust Image Manipulation"; In Proceedings of the IEEE/CVF Conference on Computer Vision and Pattern Recognition; pp. 2426-2435; dated 2022.
Kwon, G. et al, "CLIPstyler: Image Style Transfer with a Single Text Condition"; arXiv.org; arXiv:2112.00374v1; 19 pages; dated Dec. 1, 2021.
Lample, G. et al., "Fader Networks: Manipulating Images by Sliding Attributes"; Advances in Neural Information Processing Systems; 10 pages; dated 2017.
Li, B. et al, "Controllable Text-to-Image Generation"; Advances in Neural Information Processing Systems; 11 pages; dated 2019.
Li, W. et al; "Object-Driven Text-To-Image Synthesis Via Adversarial Training"; In Proceedings of the IEEE/CVF Conference on Computer Vision and Pattern Recognition; pp. 12174-12182; dated 2019.
Mokady, R. et al., "Self-Distilled StyleGAN: Towards Generation from Internet Photos"; In Special Interest Group on Computer Graphics and Interactive Techniques Conference Proceedings; 9 pages; dated 2022.
Nichol, A. et al., "GLIDE: Towards Photorealistic Image Generation and Editing with Text-Guided Diffusion Models"; arXiv.org; arXiv:2112.10741v2; 20 pages; dated Dec. 2021.
Patashnik, O. et al., "StyleCLIP: Text-Driven Manipulation of StyleGAN Imagery"; arXiv.org; arXiv:2103.17249v1; 18 pages; dated Mar. 31, 2021.
Qiao. T. et al., "Learn, Imagine and Create: Text-to-Image Generation from Prior Knowledge"; Advances in Neural Information Processing Systems; 11 pages; dated 2019.
Qiao, T. et al., "MirrorGAN: Learning Text-to-image Generation by Redescription"; In Proceedings of the IEEE/CVF Conference on Computer Vision and Pattern Recognition; pp. 1505-1514; dated 2019.
Ramesh, A. et al., "Hierarchical Text-Conditional Image Generation with CLIP Latents"; arXiv.org; arXiv:2204.06125v1; 27 pages; dated Apr. 2022.
Ramesh, A. et al., "Zero-Shot Text-to-Image Generation"; In International Conference on Machine Learning, PMLR; 11 pages; dated 2021.
Roich, D. et al., "Pivotal Tuning for Latent-based editing of Real Images"; ACM Transactions on Graphics (TOG); 14 pages; dated 2022.
Rombach, R. et al., "High-Resolution Image Synthesis with Latent Diffusion Models"; arXiv.org; arXiv:2112.10752v1; 45 pages; dated Dec. 2021.
Ronneberger, O. et al., "U-Net: Convolutional Networks for Biomedical Image Segmentation"; In International Conference on Medical Image Computing and Computer-Assisted Intervention; Springer; pp. 234-241; dated 2015.
Sohl-Dickstein, J. et al., "Deep Unsupervised Learning Using Nonequilibrium Thermodynamics"; In International Conference on Machine Learning: 10 pages; dated 2015.
Song, J. et al., "Denoising Diffusion Implicit Models"; In International Conference on Learning Representations; 19 pages; dated 2020.
Song, Y. et al., "Generative Modeling by Estimating Gradients of the Data Distribution"; Advances in Neural Information Processing Systems; 13 pages; dated 2019.

(56) References Cited

OTHER PUBLICATIONS

Tao, M. et al., "DF-GAN: Deep Fusion Generative Adversarial Networks for Text-to-Image Synthesis"; arXiv.org, Cornell University; arXiv:2008.05865v1; 13 pages; dated Aug. 2020.

Tov, O. et al., "Designing an Encoder for StyleGAN Image Manipulation"; arXiv.org, Cornell University; arXiv:2102.02766v1; 33 pages; dated Feb. 2021.

Wang, T. et al., "High-Fidelity GAN Inversion for Image Attribute Editing"; arXiv.org, Cornell University; arXiv:2109.06590; 22 pages; dated 2021.

Xia, W. et al., "TediGAN: Text-Guided Diverse Face Image Generation and Manipulation"; In Proceedings of the IEEE/CVF Conference on Computer Vision and Pattern Recognition; pp. 2256-2265; dated 2021.

Xia, W. et al., GAN Inversion: A Survey; arXiv.org, Cornell University; arXiv:2101.05278v4; 21 pages; dated Aug. 2021.

Yu, J. et al, "Scaling Autoregressive Models for Content-Rich Text-to-Image Generation"; arXiv.org, Cornell University; arXiv:2206.10789v1; 49 pages; dated Jun. 2022.

Zhang, Z. et al., "Photographic Text-To-Image Synthesis with a Hierarchically-nested Adversarial Network"; In Proceedings of the IEEE Conference on Computer Vision and Pattern Recognition; pp. 6199-6208; dated 2018.

Zhu, J. et al., "In-Domain GAN Inversion for Real Image Editing"; arXiv.org, Cornell University; arXiv:2004.00049; 31 pages; dated Jul. 2020.

Zhu, J-Y. et al., "Generative Visual Manipulation on the Natural Image Manifold"; In European Conference on Computer Vision; Springer; pp. 597-613; dated 2016.

Saharia et al., "Photorealistic Text-to-Image Diffusion Models with Deep Language Understanding" arXiv:2205.11487v1 [cs.CV] 46 pages, dated May 23, 2022.

Hertz, A. et al., "Prompt-to-Prompt Image Editing with Cross Attention Control"; arXiv.org, Cornell University; arXiv:2208.01626v1; 19 pages; dated Aug. 2, 2022.

Nichol, A. et al., "GLIDE: Towards Photorealistic Image Generation and Editing with Text-Guided Diffusion Models"; arXiv.org; Cornell University; arXiv:2112.10741v3; 20 pages; dated Mar. 8, 2022.

Li, B. et al., "ManiGAN: Text-Guided Image Manipulation"; IEEE/CVF Conference on Computer Vision and Pattern Recognition (CVPR); 10 pages; dated Jun. 13, 2020.

Bar-Tal, O. et al., "Text2LIVE: Text-Driven Layered Image and Video Editing"; arXiv.org; Cornell University; 21 pages; dated Apr. 5, 2022.

European Patent Office; International Search Report and Written Opinion issued in Application No. PCT/US2023/029149; 13 pages; dated Nov. 16, 2023.

\* cited by examiner

PROMPT-TO-PROMPT IMAGE EDITING WITH CROSS-ATTENTION CONTROL

BACKGROUND

Large-scale language-image (LLI) models, such as GOOGLE'S IMAGEN, have shown phenomenal generative semantic and compositional power, and have gained unprecedented attention from the research community and the public eye. These LLI models are trained on extremely large language-image datasets and use state-of-the-art image generative models, such as auto-regressive and/or diffusion models. These LLI models enable the generation of images conditioned on plain text, known as text-to-image synthesis. For example, these LLI models enable, in response to a plain text prompt of "photo of dog riding on a bicycle", generation of a realistic image that reflects a dog riding on a bicycle. Various LLI models have recently emerged that demonstrate unprecedented semantic generation.

Image editing is one of the most fundamental tasks in computer graphics, encompassing the process of modifying an input image through the use of an auxiliary input, such as a label, scribble, mask, or reference image.

However, many LLI models do not provide simple editing means for a generated image, and generally lack control over specific semantic regions of a given image (e.g., using text guidance only). For example, even the slightest change in the textual prompt may lead to a completely different output image being generated using an LLI model. For instance, changing "photo of dog riding on a bicycle" to "photo of white dog riding on a bicycle" can result in a completely different generated image, such as one that changes the dog's shape.

To circumvent this, many proposed LLI-based editing methods require the user to explicitly mask a part of the image to be inpainted, and drive the edited image to change in the masked area only, while matching the background of the original image. However, the masking procedure is cumbersome (e.g., requiring a large quantity of user inputs to define the mask), hampering quick and intuitive text-driven editing. Moreover, masking the image content removes important structural information, which is completely ignored in the inpainting process. Therefore, some editing capabilities are out of the inpainting scope, such as modifying the texture of a specific object.

A specifically intuitive way to edit an image is through textual prompt(s) provided by the user. However, previously proposed LLI-based editing methods can lack the ability to edit a generated image through textual prompt(s) at all or lack the ability to edit a generated image through textual prompt(s) exclusively.

SUMMARY

Some implementations of the present disclosure are directed to editing a source image, where the source image is one generated based on processing a source natural language (NL) prompt using a Large-scale language-image (LLI) model. Those implementations edit the source image based on user interface input that indicates an edit to the source NL prompt, and optionally independent of any user interface input that specifies a mask in the source image and/or independent of any other user interface input. More particularly, those implementations generate an edited image that is visually similar to the source image, but that includes visual modifications that are consistent with the edit to the source NL prompt. In doing so, various implementations can utilize the same random seed(s) that were utilized in generating the source image and, further, can leverage the internal cross-attention maps that were generated in processing the source NL prompt, using the LLI model, to generate the source image. The cross-attention maps are high-dimensional tensors that bind pixels and tokens extracted from the prompt text. For example, various implementations can inject at least some of the cross-attention maps during at least some iterations of the diffusion process that is based on the edited prompt, thereby controlling which pixels attend to which tokens of the edited prompt text during which diffusion steps.

Accordingly, various implementations provide an intuitive image editing interface through editing only the textual prompt that was utilized in generating a source image (also referred to herein as prompt-to-prompt editing). This enables voice-based, typed (e.g., physical or virtual keyboard), and/or touch-based (e.g., interaction with an emphasis element, selection of alternative term(s)) input to edit a source image, and obviates the need for any specification of an image mask and/or other input(s). Such inputs for editing are natural, can be made with low latency, and enable various editing tasks that are challenging otherwise. Further, implementations disclosed herein do not require extra, and computationally expensive, model training, fine-tuning, extra data, or optimization.

As a non-limiting example, assume the source NL prompt is "a furry bear watching a bird", the source image reflects a furry bear that is watching a red bird, and the source image is generated based on processing, using an LLI model, "a furry bear watching a bird" and a random seed. The edit to the source NL prompt can include a replacement of a subset of tokens of the source NL prompt with replacement token(s) (e.g., replacing "bird" with "butterfly"), an addition of token(s) to the source NL prompt (e.g., adding "blue" before "bird"), and/or an adjustment of emphasis on token(s) of the source NL prompt (e.g., increasing emphasis on "fuzzy").

Implementations can generate an edited image by processing, using the LLI model, feature(s) generated based on the edit to the source NL prompt, the source random seed and, in at least some of the iterations of processing, at least a portion of the cross-attention maps that were generated in generating the source image. Utilization of the cross-attention maps, in combination with the source random seed, in generating the edited image results in an edited image that is visually similar to the source image, but that includes visual modifications that are consistent with the edit. For instance, if "bird" is replaced with "butterfly", the edited image can replace the "red bird" of the source image with a "butterfly", but otherwise be very visually similar. Also, for instance, if "blue" is added before "bird", the edited image can replace the "red bird" with a "blue bird", but otherwise be very visually similar. As yet another instance, if emphasis on "furry" is increased, the edited image can replace the "bear" with a "furrier bear" (e.g., more and/or longer fur), but otherwise be very visually similar. Notably, utilization of the source random seed, without utilization of the cross-attention maps, can result in images that are visually dissimilar from the source image.

Some implementations of the present disclosure are directed to applying prompt-to-prompt editing techniques disclosed herein to editing a source image that is one generated based on a real image, and that approximates the real image. In those implementations, the initial prompt that is edited can be, for example, one specified by user interface input and/or one automatically generated (e.g., using an automatic captioning model). Further, in some of those implementations, the source image is generated by generating a noise vector for the real image (e.g., using an inversion process) and processing, using an LLI model and the noise vector, the initial prompt to generate the source image that approximates the real image.

It should be appreciated that all combinations of the foregoing concepts and additional concepts described in greater detail herein are contemplated as being part of the subject matter disclosed herein. For example, all combinations of claimed subject matter appearing at the end of this disclosure are contemplated as being part of the subject matter disclosed herein.

DETAILED DESCRIPTION

Figure 1A:
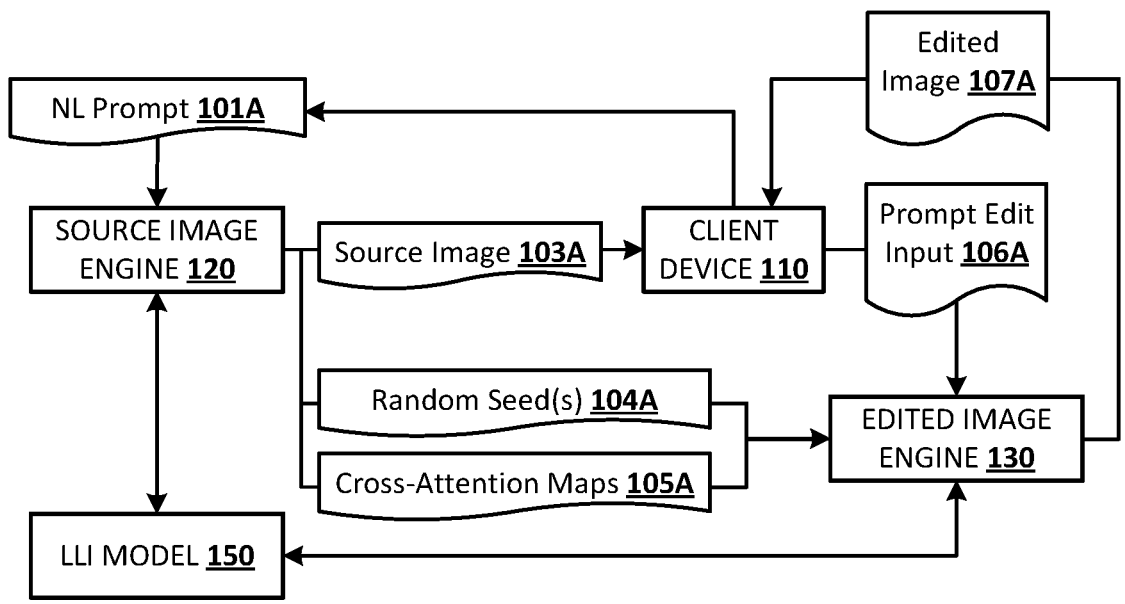
FIG. 1A schematically depicts example components and interactions that can be involved in generating a source image based on processing a natural language prompt using an LLI model and generating, using the LLI model, an edited image that is visually similar to the source image, but that includes visual modifications consistent with an edit to an NL prompt used to generate the source image.

Prior to turning to the figures, a non-limiting overview of various implementations is provided.

As a working example of various implementations disclosed herein, let I be a source image that was generated by an LLI model (e.g., a text-guided diffusion model) using the a prompt P and a random seed s. Some implementations seek to edit the source image I guided only by an edited prompt P*, resulting in an edited image I*. For example, consider a source image I that is generated from the prompt P "my new bicycle", and assume that the user wants to edit the color of the bicycle, its material, or even replace it with a scooter while preserving the appearance and structure of the source image I. An intuitive interface for the user is to directly change the text prompt P by further describing the appearance of the bike (e.g., adding "green" before "bicycle"), or replacing it with another word (e.g., replacing "bicycle" with "scooter"). As opposed to some prior techniques, various implementations disclosed herein avoid relying on any user-defined mask (e.g., defined through interaction with the source image I) to assist or signify where the edit to the source image I should occur. For example, those various implementations avoid relying on any user-defined mask that defines the "bicycle" in the source image I and that is generated based on user interaction with the source image I. Moreover, various implementations disclosed herein recognize that processing, using the LLI model, only (a) the same random seed s that was used in generating the source image (I) and (b) the edited text prompt P* (in lieu of the original text prompt), results in a completely different image with a different structure and composition. For example, if (b) the edited text prompt P* is "my new green bicycle" (where "green" is added before "bicycle), processing only (a) the same random seed s and (b) the edited text prompt P* can result in a generated image that includes a "green bicycle". However, relative to the source image I, such a generated image will have a different structure and composition (e.g., will include different background object(s)).

Implementations disclosed herein recognize that the structure and appearances of the generated image depend not only on the random seed s, but also on the interaction between the pixels to the text embedding through the diffusion process. More particularly, implementations disclosed herein recognize that through modifying the pixel-to-text interaction that occurs in cross-attention layers, prompt-to-prompt image editing capabilities are enabled that maintain the structure and composition of the source image I that is being edited. More specifically, injecting, in generating the edited image I* using the LLI model, at least some of the cross-attention maps produced in generating the source image I enables preservation of the composition and structure of the source image I.

For additional context on cross-attention maps, a particular example of cross-attention in an IMAGEN LLI model (that includes text-conditioned diffusion models) is described in more detail. Implementations of IMAGEN include three text-conditioned diffusion models: a text-to-image 64×64 model, and two super-resolution models—a 64×64→256×256 model and a 256×256→1024×1024 model. These predict the noise $\in_{74}(z_t, c, t)$ via a U-shaped network, for t ranging from T to 1, where $z_t$ is the latent vector and c is the text embedding. More particularly, the 64×64 model starts from a random noise seed, and uses the U-Net. That model is conditioned on text embeddings via both cross-attention layers at resolutions and hybrid-attention layers at resolutions of the downsampling and upsampling within the U-Net. The 64×64→256×256 model conditions on a naively upsampled 64×64 image. An efficient version of a U-Net is used, which includes Hybrid attention layers in the bottleneck (resolution of 32). The 256×256→1024×1024 model conditions on a naively upsampled 256×256 image. An efficient version of a U-Net is used, which only includes cross-attention layers in the bottleneck (resolution of 64).

With such an IMAGEN LLI model, and/or other LLI model(s), the composition and geometry are mostly determined at the resolution of the output of the text-to-image model/the input to the initial super-resolution model (e.g., 64×64 in the preceding example). Accordingly, some implementations can, in generating an edited image, perform adaptations only at the text-to-image diffusion process, using the super-resolution process as is. In generating an image using the IMAGEN LLI model, and/or other LLI model(s), each diffusion step or iteration t includes predicting the noise f from a noisy image $z_t$ and text embedding $\psi$ ($\mathcal{P}$) using a U-shaped network. At the final diffusion step, this process yields the generated image $I=z_0$. Notably, the interaction between the two modalities occurs during the noise prediction, where the embeddings of the visual and textual features are fused using cross-attention layers that produce spatial attention maps for each textual token.

More formally, the deep spatial features of the noisy image $\phi(z_t)$ are projected to a query matrix $Q=\ell_Q(\phi(z_t))$, and the textual embedding is projected to a key matrix $K=\ell_K(\psi(\mathcal{P}))$ and a value matrix $V=\ell_V(\psi(\mathcal{P}))$, via learned linear projections $\ell_Q$, $\ell_K$, $\ell_V$. The attention maps are then $$M = \text{Softmax}\left(\frac{QK^T}{\sqrt{d}}\right),$$

where the cell $M_{ij}$ defines the weight of the value of the j-th token on the pixel i, and where d is the latent projection dimension of the keys and queries. Finally, the cross-attention output is defined to be $\hat{\phi}(z_t)=MV$, which is then used to update the spatial features $\phi(z_t)$.

Intuitively, the cross-attention output MV is a weighted average of the values V where the weights are the attention maps M, which are correlated to the similarity between the query matric Q and the key matrix K. In practice, to increase their expressiveness, multi-head attention can be used in parallel, and then the results are concatenated and passed through a learned linear layer to get the final output.

IMAGEN and/or other LLI model(s) condition on the text prompt in the noise prediction of each diffusion step through two types of attention layers: i) cross-attention layers and ii) hybrid attention that acts both as self-attention and cross-attention by concatenating the text embedding sequence to the key-value pairs of each self-attention layer. Both of them can be referred to as cross-attention since various implementations can intervene only in the cross-attention part of the hybrid attention. That is, only the last channels, which refer to text tokens, are modified in the hybrid attention modules.

In controlling cross-attention in an IMAGEN LLI model and/or other LLI model(s), it is noted again that the spatial layout and geometry of a generated image depend on the cross-attention maps that are produced in generating the image. This interaction between pixels and text can be observed from a plotting of the average attention maps produced in generating an image. In such a plotting, it can be observed that pixels are more attracted to the words that describe them. For example, for a prompt that includes the word "bear", it can be observed that pixels that depict the bear are correlated with the word "bear". Such an observation indicates that the structure of the image is already determined in the early steps of the diffusion process.

Since the attention reflects the overall composition, the attention maps M, that were obtained from the generation of a source image I using an original prompt P and an LLI model, can be injected into a second generation using a modified prompt P* and the LLI model, in generating an edited image I*. This allows the synthesis of an edited image I* that is not only manipulated according to the edited prompt, but also preserves the structure of the input image I. Such an example is a specific instance of a broader set of attention-based manipulations enabling different types of intuitive editing. Accordingly, the following paragraphs describe a more general framework, followed by the details of various specific editing operations.

Let DM $(z_t, \mathcal{P}, t, s)$ be the computation of a single step t of the diffusion process, which outputs the noisy image $z_{t-1}$, and the attention map $M_t$ (omitted if not used). DM $(z_t, \mathcal{P}, t, s)\{M \rightarrow \hat{M}\}$ denotes the diffusion step where the attention map M is overridden with an additional given map $\hat{M}$, but the values V, from the supplied prompt, are kept. $M^*_t$ denotes the produced attention map using the edited prompt $\mathcal{P}^*$, Edit$(M_t, M^*_t, t)$ is defined to be a general edit function, receiving as input the t'th attention maps of the original and edited images during their generation.

A general algorithm for controlled image generation can include performing the iterative diffusion process for both prompts simultaneously, where an attention-based manipulation is applied in each step according to the desired editing task. The internal randomness that is used in each of the diffusion processes, which can be reflected by random seed(s), can be fixed/the same in each process. This is due to the nature of diffusion models, where even for the same prompt, two random seeds produce drastically different outputs. Formally, our general algorithm is:

More formally, a general algorithm for various implementations can be:

---

Algorithm 1: Prompt-to-Prompt image editing

1 Input: A source prompt $\mathcal{P}$, a target prompt $\mathcal{P}^*$, and a random seed s.
2 Output: A source image $\mathcal{X}_{src}$ and an edited image $\mathcal{X}_{dst}$.
3 $z_T \sim N(0, I)$ a unit Gaussian random variable with random seed s;
4 $z_T^* \leftarrow z_T$;
5 for t = T, T − 1, ... ,1 do
6   $z_{t-1}, M_t \leftarrow$ DM$(z_t, \mathcal{P}, t, s)$;
7   $M_t^* \leftarrow$ DM$(z_t^*, \mathcal{P}^*, t, s)$;
8   $\hat{M}_t \leftarrow$ Edit$(M_t, M_t^*, t)$;
9   $z_{t-1}^* \leftarrow$ DM $(z_t^*, \mathcal{P}^*, t, s_t)\{M \leftarrow \hat{M}_t\}$;
10 end
11 Return $(z_0, z_0^*)$

---

It is noted that, in the preceding algorithm, an image I, which is generated by prompt P and random seed s, can be defined as an additional input. Yet, the algorithm would remain the same. Also, note that, in the preceding algorithm, the forward call in line 7 can be skipped by applying the edit function inside the diffusion forward function. Additionally or alternatively, a diffusion step can be applied on both $z_{t-1}$ and $z^*_t$ in the same batch (i.e., in parallel), and so there is only one step overhead with respect to the original inference of the diffusion model.

Some examples of specific editing operations, that can be used to define Edit$(M_t, M^*_t, t)$, are now provided. Those examples include word swap (also referred to as replacement), adding a new phrase (also referred to as addition), and attention reweighting (also referred to as emphasis adjustment).

With word swap, user interface input is provided that indicates a user has swapped token(s) of the original prompt with others. For example, "bicycle" can be swapped for "car" when the user interface input indicates an edit of the original prompt of "a big red bicycle" to an edited prompt of "a big red car". Such user interface input can be via touch and/or typed inputs to delete "bicycle" and type "car" and/or via spoken user interface input (e.g., spoken input of "replace bicycle with car"). With word swap and/or other editing operations, a challenge is to preserve the original composition while also addressing the content of the edited prompt. To this end, implementations inject the attention maps produced in generating the source image into the generation of the edited image using the edited prompt. However, the proposed attention injection may over constrain the geometry, especially when a large structural modification, such as "bicycle" to "car", is involved. Such over constraining of the geometry can be addressed, in some implementations of word swap edits, by a softer attention constraint. For example, the softer attention constraint can be represented by the editing function:

$$\text{Edit}(M_t, M_t^*, t) := \begin{cases} M_t^* & \text{if } t < \tau \\ M_t & \text{otherwise} \end{cases}.$$

In the preceding editing function, $\tau$ is a timestamp/iteration parameter that determines until which step the injection is applied. Note that the composition is determined in the early steps of the diffusion process. Therefore, by limiting the number of injection steps, the composition of the newly generated image can be guided while still allowing the necessary geometry freedom for adapting to the new prompt. An additional or alternative adaptation is to assign a different number of injection timestamps for the different tokens in the prompt. In case the two words are represented using a different number of tokens, the maps can be duplicated/averaged as necessary using an alignment function, such as that described with respect to adding a new phrase.

With adding a new phrase, user interface input is provided that indicates a user has added new token(s) to the original prompt. For example, "children drawing of" can be prepended to an original prompt of "a castle next to a river", when the user interface input indicates such prepending. For example, the user interface input can include typing "children drawing of" at the beginning of the original prompt or can be spoken user interface input such as "prepend children drawing of". With adding a new phrase, to preserve the common details implementations can apply the attention injection only over the common token(s) from both prompts. For example, the attention injection can be applied only over "a castle next to a river" in the preceding example. More formally, an alignment function A can be utilized that receives a token index from edited prompt $\mathcal{P}^*$ and outputs the corresponding token index in $\mathcal{P}^*$ or none if there isn't a match. With such an alignment function, an example editing function can be represented by:

$$\text{Edit}(M_t, M_t^*, t)_{i,j} := \begin{cases} (M_t^*)_{i,j} & \text{if } A(j) = \text{None} \\ (M_t)_{i,A(j)} & \text{otherwise} \end{cases}.$$

In the preceding editing function, recall that index i corresponds to a pixel value, where j corresponds to a text token. Optionally, the preceding editing function can optionally, and similarly to the word swap editing function, set a timestamp, $\tau$ to control the number of diffusion steps in which the injection is applied. Such an editing function enables diverse prompt-to-prompt capabilities such as stylization, specification of object attributes, or global manipulations.

With attention re-weighting, user interface input is provided that indicates a user desire to strengthen or weaken the extent to which token(s) of the original prompt are affecting the original source image. For example, the original prompt can be "a fluffy red ball", and the user may want an edited image where the ball is more fluffy or less fluffy than it is in the original image. User interface input that indicates such an increase or decrease in fluffiness can be, for example, interaction with a slider or up and down arrows that are presented in conjunction with "fluffy", bolding or underlining "fluffy", and/or spoken input (e.g., "more fluffy"). With attention re-weighting of token(s) of an original prompt, the attention map of the assigned token(s) j*, corresponding to the token(s) to which the emphasis user interface input is directed, with a scaling parameter c. For example, the scaling parameter c can be a negative parameter when the emphasis input indicates a decrease and a positive parameter when the emphasis input indicates an increase, and can optionally have a magnitude that is based on an extent of the increase or decrease that is indicated by the emphasis input. For instance, the scaling parameter c can be represented $c \in [-2, 2]$. The remainder of the attention maps can remain unchanged. Such an editing function can be represented by $$\text{Edit}(M_t, M_t^*, t)_{i,j} := \begin{cases} c \cdot (M_t)_{i,j} & \text{if } j = j^* \\ (M_t)_{i,j} & \text{otherwise} \end{cases}.$$

Some non-limiting examples of practical applications of various implementations are now provided, which demonstrate the enablement of intuitive text-only editing by controlling the spatial layout corresponding to each word in the user-provided prompt.

One practical application is localized editing of a source image through editing of a user-provided source prompt and without requiring any user-provided mask. For example, a source image can be generated using the prompt "lemon cake" and an LLI model. User interface input can replace "lemon" with "pumpkin", resulting in an edited prompt of "pumpkin cake". Through utilization of implementations disclosed herein, an edited image can be generated that retains the spatial layout, geometry, and semantics of the source image. On the other hand, naively feeding the synthesis model with the prompt "pumpkin cake" results in a completely different geometry, even when using the same random seed in a deterministic setting.

Another practical application is performing structural modifications to a source image, in addition to or instead of modifying only textures. For example, a source image can be generated using a prompt that includes "bicycle" (among other word(s)) and an LLI model, and user interface input can replace "bicycle" with "car". Through utilization of implementations disclosed herein, an edited image can be generated that changes a "bicycle" of the source image to a "car" in the edited image. It is observed that, the more diffusion steps in which cross-attention injection is applied in generating the edited image, the higher the fidelity to the original image. However, the optimal result is not necessarily achieved by applying the injection throughout all diffusion steps. Therefore, cross-attention injection can optionally be applied to only a subset of steps or iterations, such as a threshold percentage that is between 5% and 95%, between 15% and 90%, or between other bound(s). Optionally, interactive user interface element(s) can be presented, along with an edited prompt, that enable user input to define the fidelity, to the original image, that should be adhered to in generating the edited image. When such user interface element(s) are provided, the subset of steps or iterations to which cross-attention injection applies can correspond to the user interface input directed to those interactive user interface element(s) (if any). For example, the interactive user interface element(s) can include a slider, and the quantity of iterations to which cross-attention injection applied can be based on a position of the slider.

Another practical application is, instead of replacing one word with another, a user may wish to add a new specification to the generated source image. For example, the generated source image can be generated based on a source prompt of "a car on the side of the street" and user interface input can be provided that adds "crushed" before car, resulting in an edited prompt of "a crushed car on the side of the street". In such a case, the attention maps of the source prompt can be utilized in generating the edited image, while also allowing the newly added word ("crushed"), and corresponding attention maps, to be utilized in generating the edited image. This can result in an edited image that includes a crushed car (whereas the source image did not), while the background of the source image is still preserved.

Another practical application is preserving the image composition of a source image while performing global editing. In such an application, the editing should affect all parts of the image, but still retain the original composition, such as the location and identity of the objects. For example, editing a source prompt of "a car on the side of the street" to "a car in the snowy street" can retain the background and the car of the source image, while adding snow to the background and the car. As another example, editing a source prompt of "photo of a waterfall" to "impressionism painting of a waterfall" can retain the original composition of the source image, while changing it from a photo to an impressionism painting.

While various implementations are described herein with respect to applying prompt-to-prompt editing techniques to a source image that is one generated by processing a source prompt using an LLI model, implementations of the present disclosure are additionally or alternatively directed to applying prompt-to-prompt editing techniques disclosed herein to editing a source image that is one generated based on a real image (e.g., captured by a real-world physical camera), and that approximates the real image. In those implementations, the initial prompt that is edited can be, for example, one specified by user interface input and/or one automatically generated (e.g., using an automatic captioning model). Further, in some of those implementations, the source image is generated by generating a noise vector for the real image (e.g., using an inversion process) and processing, using an LLI model and the noise vector, the initial prompt to generate the source image that approximates the real image.

Implementations that apply prompt-to-prompt editing techniques to editing a source image recognize that editing a real image can require finding an initial noise vector that produces the given input image when fed into the diffusion process. This process is generally known as inversion, but is traditionally not utilized for LLIs such as text-guided diffusion models. A naïve approach would be to add Gaussian noise to the real image, and then perform a predefined number of diffusion steps. However, such an approach can result in significant distortions. Accordingly, some implementations disclosed herein adopt an improved inversion approach that is based on a deterministic denoising diffusion implicit model (DDIM) model rather than a denoising diffusion probabilistic model (DDPM). Those implementations can perform the diffusion process in the reverse direction, that is $x_0 \rightarrow x_T$ instead of $x_T \rightarrow x_0$, where $x_0$ is set to be the real image.

Such an inversion process can produce satisfactory results. However, such an inversion is not sufficiently accurate in many other cases. This can be due, in part, due to a distortion-editability tradeoff, where reducing the classifier-free guidance parameter (i.e., reducing the prompt influence) improves reconstruction but constrains ability to perform significant manipulations. To alleviate this limitation, some implementations restore the unedited regions of the original image using a mask, directly extracted from the attention maps. Note that in those implementations the mask is generated with no guidance from the user. Moreover, in some of those implementations, the approach can work even using the naïve DDPM inversion scheme (adding noise followed by denoising).

DDPMs are generative latent variable models that aim to model a distribution $p_\theta(x_0)$ that approximates the data distribution $q(x_0)$ and that are easy to sample from. DDPMs model a "forward process" in the space of $x_0$ from data to noise.

This process is a Markov chain starting from $x_0$, where noise is gradually added to the data to generate the latent variables $x_1, \ldots, x_T \in X$. The sequence of latent variables therefore follows $$q(x_1, \ldots, x_t | x_0) = \prod_{i=1}^{t} q(x_i | x_{i-1}),$$

where a step in the forward process is defined as a Gaussian transition $q(x_t | x_{t-1}) = N(x_t; \sqrt{1-\beta_t} \, x_{t-1}, \beta_t I)$ parameterized by a schedule $\beta_0, \ldots, \beta_T \in (0,1)$. When T is large enough, the last noise vector $x_T$ nearly follows an isotropic Gaussian distribution.

An interesting property of the forward process is that one can express the latent variable $x_t$ directly as the following linear combination of noise and $x_0$ without sampling intermediate latent vectors: $x_t = \sqrt{\alpha_t} x_0 + \sqrt{1-\alpha_t} w$, $w \sim N(0, I)$, where $$\alpha_t := \prod_{i=1}^{t}(1-\beta_i).$$

In order to sample from the distribution $q(x_0)$, the dual "reverse process" $p(x_{t-1} | x_t)$, from isotropic Gaussian noise $x_T$ to data, is defined by sampling the posteriors $q(x_{t-1} | x_t)$. Since the intractable reverse process $q(x_{t-1} | x_t)$ depends on the unknown data distribution $q(x_0)$, it can be approximated with a parameterized Gaussian transition network $p_\theta(x_{t-1} | x_t) = N(x_{t-1} | \mu_\theta(x_t, t), \Sigma_\theta(x_t, t))$. The $\mu_\theta(x_t, t)$ can be replaced [17] by predicting the noise $\epsilon_\theta(x_t, t)$ added to $x_0$ using equation 2.

Under this definition, Bayes' theorem can be used to approximate $$\mu_\theta(x_t, t) = \frac{1}{\sqrt{\alpha_t}}\left(x_t - \frac{\beta_t}{\sqrt{1-\alpha_t}}\epsilon_\theta(x_t, t)\right).$$

Once there is a trained $\epsilon_\theta(\ell_t, t)$, following sample method can be used: $\ell_{t-1} = \mu_\theta(\ell_t, t) + \sigma_t z, z \sim N(0, I)$. The $\sigma_t$ of each sample stage can be controlled, and in DDIMs the sampling process can be made deterministic using $\sigma_t = 0$ in all the steps. The reverse process can finally be trained by solving the following optimization problem:

$$\min_\theta L(\theta) := \min_\theta E_{x_0 \sim q(x_0), w \sim N(0,I), t} \|w - \epsilon_\theta(x_t, t)\|_2^2,$$

teaching the parameters $\theta$ to fit $q(\ell_0)$ by maximizing a variational lower bound.

Turning now to the Figures, FIG. 1A schematically depicts example components and interactions that can be involved in generating a source image 103A based on processing a natural language prompt 101A using an LLI model 150 and generating, using the LLI model 150, an edited image 107A that is visually similar to the source image 103A, but that includes visual modifications consistent with an edit, to an NL prompt used to generate the source image 103A, that is reflected in prompt edit input 106A.

In FIG. 1A, a client device 110 can provide an NL prompt 101A, such as a working example of "photo of an orange cat riding on a bicycle". The NL prompt 101A can be generated based on user interface input provided by a user at the client device 110, such as typed or spoken input. For example, the NL prompt 101A can be based on text from speech recognition that is performed based on spoken input received at the client device 110.

The source image engine 120 can process the NL prompt 101A, using an LLI model 150, to generate a source image 103A. In generating the source image 103A, one or more random (truly random, or pseudo-random) seeds 104A can be utilized. Further, cross-attention maps 105A are produced in generating the source image 103A. The random seed(s) 104A and the cross-attention maps 105A can be provided to the edited image engine 130.

The edited image engine 130 receives prompt edit input 106A, that is user interface input provided at the client device 110 and that specifies one or more edits to the NL prompt 101A, such as replacement input (e.g., replacing "bicycle" with "horse"), addition input (e.g., adding "green" before "bicycle"), and/or emphasis adjustment input (e.g., increasing emphasis on "orange"). In response to receiving the prompt edit input 106A, the edited image engine 130 can interact with the LLI model 150 in generating an edited image 107A that is visually similar to the source image 103A but that includes visual modifications that are consistent with the edit(s), to the NL prompt 101A, that are reflected by the prompt edit input 106A.

In interacting with the LLI model 150 in generating the edited image 107A, the edited image engine 130 can utilize the random seed(s) 104A that were utilized in generating the source image 103A, can utilize edit features that are based on the edit reflected by the prompt edit input 106A (e.g., a text embedding of a modified prompt reflected by the edit), and can utilize at least some of the cross-attention maps 105A in at least some of the iterations of generating the edited image 107A. Which cross-attention maps 105A are utilized in generating the edited image 107A, and/or which iterations the cross-attention maps are utilized in, can be dependent on the type(s) of edit(s) reflected by the prompt edit input 106A (e.g., dependent on whether the edit is of a replacement, addition, or emphasis adjustment type).

Figure 1B:
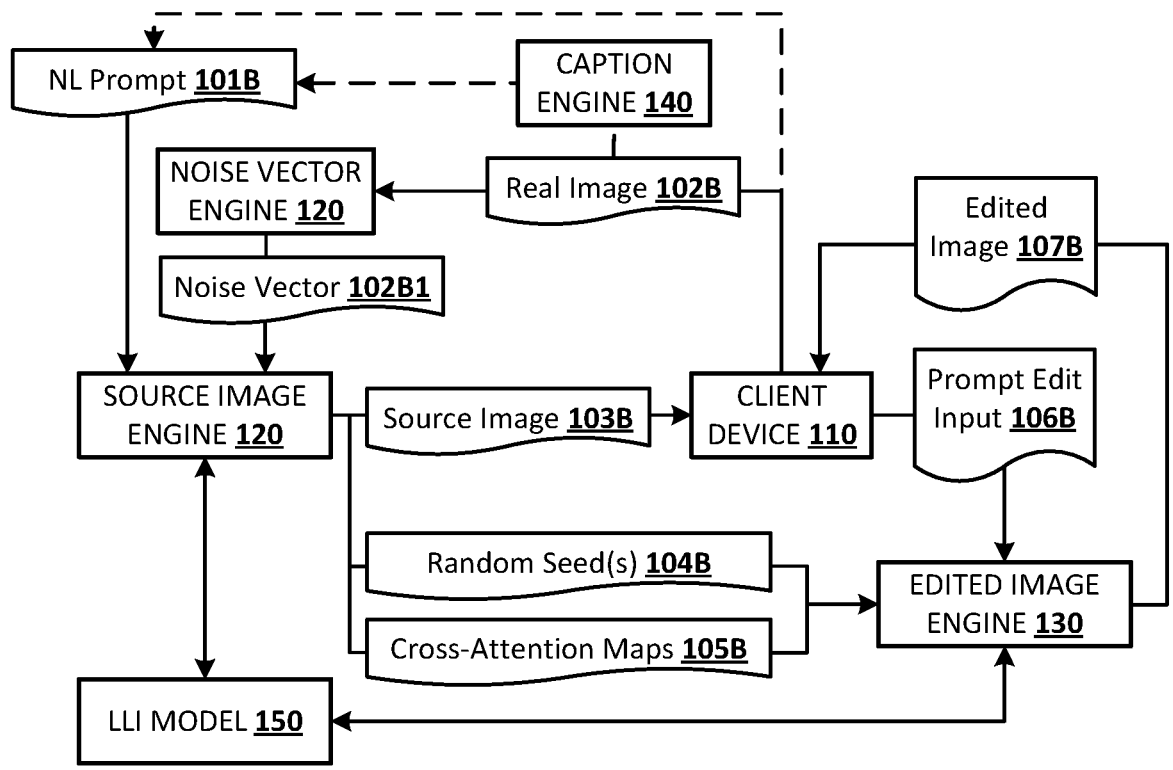
FIG. 1B schematically depicts example components and interactions that can be involved in generating, using an LLI model, a source image that approximates a real image and generating, using the LLI model, an edited image that is visually similar to the source image, but that includes visual modifications consistent with an edit to an NL prompt used to generate the source image.

FIG. 1B schematically depicts example components and interactions that can be involved in generating, using the LLI model 150, a source image 103B that approximates a real image 102B and generating, using the LLI model 150, an edited image that is visually similar to the source image 103B, but that includes visual modifications consistent with an edit to an NL prompt used to generate the source image 103B, that is reflected in prompt edit input 106B.

In FIG. 1B, a client device 110 can provide a real image 102B to a noise vector engine 120. The noise vector engine 120 can generate a noise vector 102B1 for the real image 102B. For example, the noise vector engine 120 can generate the noise vector 102B1 using an inversion process and the real image, such as by using a DDIM or DDPM inversion process. The noise vector 102B1 is provided to the source image engine 120, along with an NL prompt 101B for the real image 102B. The NL prompt 101B can be provided by the client device and based on user interface input (e.g., user interface input that is a user-curated caption for the real image 102B) and/or can be provided by a caption engine 140 that automatically generates the NL prompt by processing the real image 102B using a caption model.

The source image engine 120 can process the NL prompt 101B and the noise vector 102B1, using an LLI model 150, to generate a source image 103B that approximates the real image 102B. In generating the source image 103B, one or more random (truly random, or pseudo-random) seeds 104B can be utilized. Further, cross-attention maps 105B are produced in generating the source image 103B. The random seed(s) 104B and the cross-attention maps 105B can be provided to the edited image engine 130.

The edited image engine 130 receives prompt edit input 106B, that is user interface input provided at the client device 110 and that specifies one or more edits to the NL prompt 101B (which can be rendered at the client device 110—optionally based on output from the caption engine 140), such as replacement input, addition input, and/or emphasis adjustment input. In response to receiving the prompt edit input 106B, the edited image engine 130 can interact with the LLI model 150 in generating an edited image 107B that is visually similar to the source image 103B but that includes visual modifications that are consistent with the edit(s), to the NL prompt 1016, that are reflected by the prompt edit input 106B.

In interacting with the LLI model 150 in generating the edited image 107B, the edited image engine 130 can utilize the random seed(s) 104B that were utilized in generating the source image 103B, can utilize edit features that are based on the edit reflected by the prompt edit input 106B (e.g., a text embedding of a modified prompt reflected by the edit), and can utilize at least some of the cross-attention maps 105B in at least some of the iterations of generating the edited image 107B. Which cross-attention maps 105B are utilized in generating the edited image 107B, and/or which iterations the cross-attention maps are utilized in, can be dependent on the type(s) of edit(s) reflected by the prompt edit input 106B (e.g., dependent on whether the edit is of a replacement, addition, or emphasis adjustment type).

Figure 2:
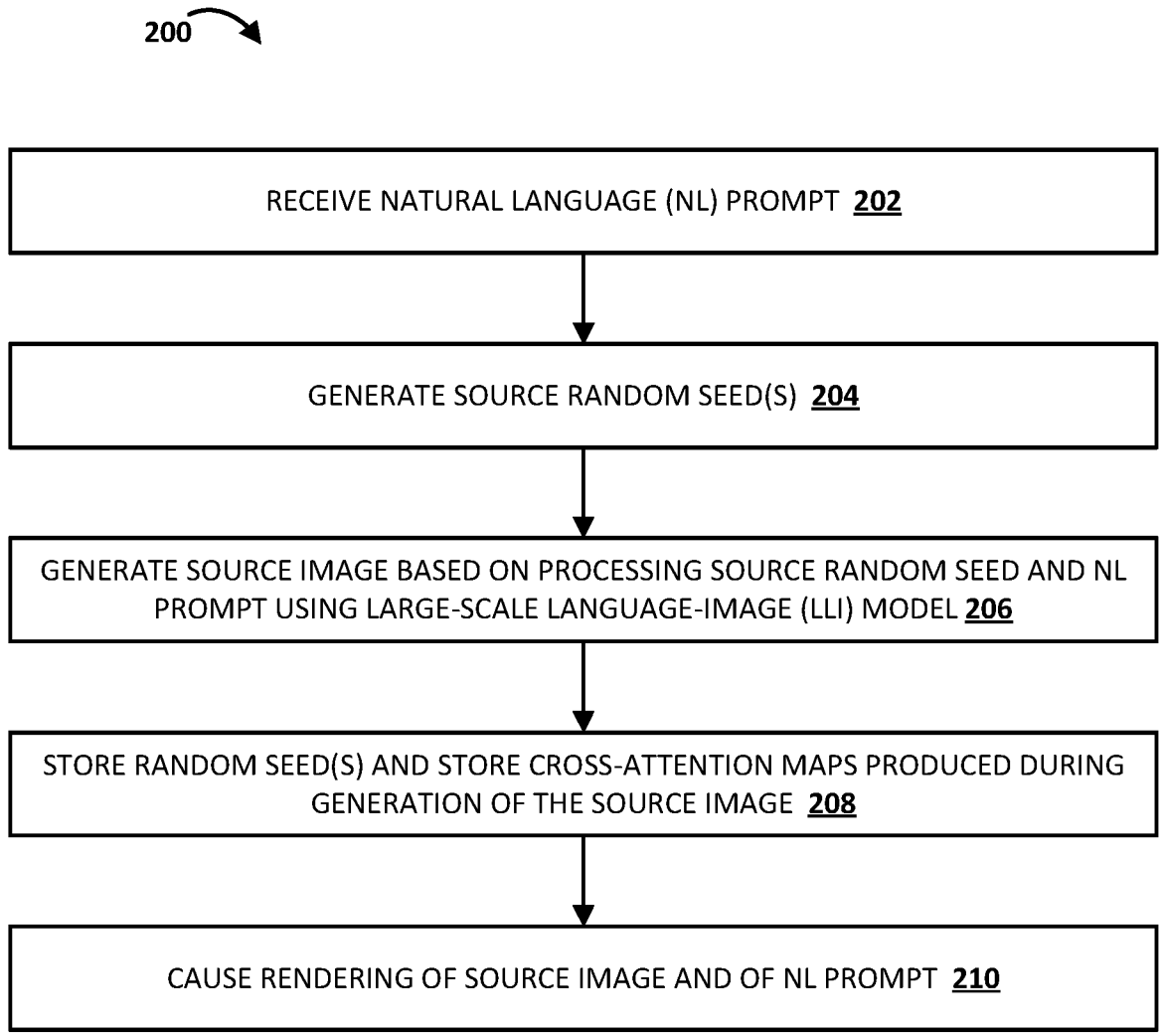
FIG. 2 illustrates an example method of generating a source image based on processing a natural language prompt using an LLI model, and storing random seed(s) used in the processing and cross-attention maps produced in the processing.

FIG. 2 illustrates an example method 200 of generating a source image based on processing a natural language prompt using an LLI model, and storing random seed(s) used in the processing and cross-attention maps produced in the processing. For convenience, the operations of the flow chart are described with reference to a system that performs the operations. This system can include various components of various computer systems, such as one or more components of server computing device(s). Moreover, while operations of method 200 are shown in a particular order, this is not meant to be limiting. One or more operations can be reordered, omitted or added.

At block 202, the system receive a natural language prompt. For example, the natural language prompt can be one provided based on user interface input at a client device, such as user interface input directed to an interface or front end of the system, that is accessible via the client device.

At block 204, the system generates one or more source random seeds. For example, the system can use a random or pseudo-random process to generate the source random seed(s).

At block 206, the system generates a source image based on processing the source random seed, of block 204, and the NL prompt, of block 202, using an LLI model. In generating the source image based on the processing using the LLI model, cross-attention maps are produced as described herein. The cross-attention maps can include values that bind tokens of the NL prompt to pixels of the generated source image.

At block 208, the system stores (e.g., at least temporarily in memory) the random seed(s) of block 204 and the cross-attention maps produced during the generation of the source image at block 206.

At block 210, the system causes rendering of the source image and of the NL prompt 210. For example, the system can cause such rendering at a client device that provided the natural language prompt of block 202.

Figure 3:
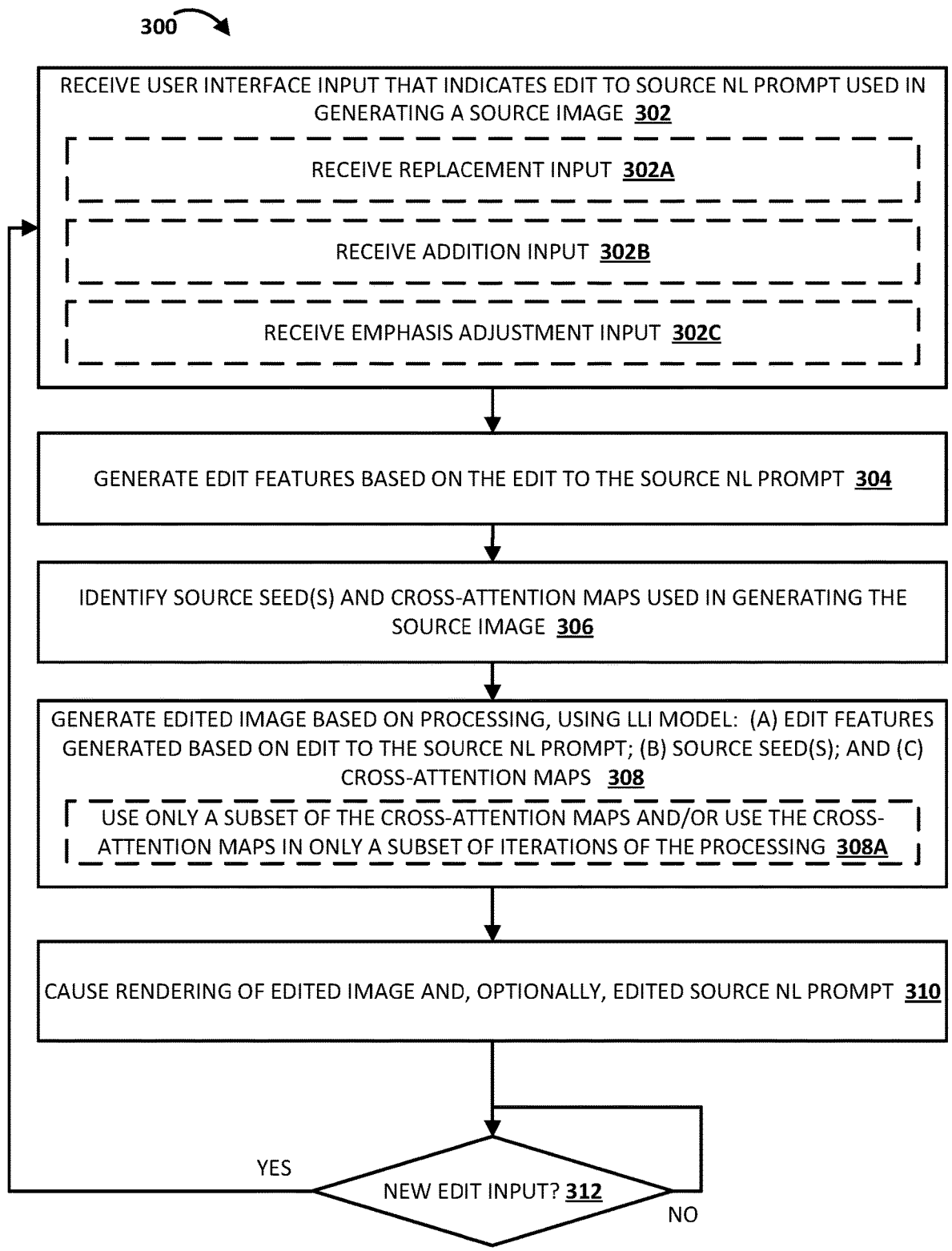
FIG. 3 illustrates an example method of generating, using an LLI model, an edited image that is visually similar to a source image, but that includes visual modifications consistent with an edit to an NL prompt used to generate the source image.

FIG. 3 illustrates an example method 300 of generating, using an LLI model, an edited image that is visually similar to a source image, but that includes visual modifications consistent with an edit to an NL prompt used to generate the source image. For convenience, the operations of the flow chart are described with reference to a system that performs the operations. This system can include various components of various computer systems, such as one or more components of server computing device(s). Moreover, while operations of method 300 are shown in a particular order, this is not meant to be limiting. One or more operations can be reordered, omitted or added.

At block 302, the system receives user interface input that indicate an edit to a source NL prompt used in generating a source image. The user interface input can be received, at a client device, responsive to rendering of the source image and, optionally, responsive to rendering the NL prompt used in generating the source image. The source image can be the source image of block 206 of an iteration of method 200 of FIG. 2 and the NL prompt can be the NL prompt of block 206 of the iteration of method 200 of FIG. 2. Alternatively, the source image can be the source image (that approximates a real image) of block 410 of an iteration of method 400 of FIG. 4 and the NL prompt can be the NL prompt of block 404 of the iteration of method 400 of FIG. 4.

In various implementations, block 302 includes one or more of sub-blocks 302A, 302B, and 302C. At sub-block 302A, the user interface of block 302 input includes replacement input. The replacement input can reflect an edit that is a replacement, of a subset of tokens of the source NL prompt, with one or more replacement tokens that differ from the subset of tokens of the source NL prompt. At sub-block 302B, the user interface of block 302 input includes addition input. The addition input can reflect an edit that is an addition, of one or more additional tokens, to the source NL prompt. At sub-block 302A, the user interface of block 302 input includes emphasis adjustment input. The emphasis adjustment input can reflect an edit that is an adjustment of emphasis on one or more emphasis tokens of the source NL prompt, where the adjustment is an increase or decrease of emphasis and can optionally reflect a magnitude of the increase or decrease.

At block 304, the system generates edit features based on the edit to the source NL prompt, that is reflected by the user interface input received at block 302. For example, where the edit is a replacement, the system can generate edit features that include a text embedding of a modified prompt that conforms to the source NL prompt, but replaces the subset of tokens of the source NL prompt with the edited tokens. As another example, where the edit is an addition, the system can generate edit features that include a text embedding of a modified prompt that includes the source NL prompt and the additional tokens. As yet another example, where the edit is an adjustment of emphasis on emphasis token(s), the system can generate edit features that include scaled attention map(s) for the one or more emphasis token(s).

At block 306, the system identifies source seed(s) and cross-attention maps used in generating the source image of block 302. The source seed(s) and cross-attention maps can be those of generating a source image in an iteration of method 200 of FIG. 2, or those of generating a source image (that approximates a real image) in an iteration of method 400 of FIG. 4.

At block 308, the system generates an edited image based on processing, using an LLI model, (A) edit features generated based on edit to the source NL prompt (generated at block 304), (B) the source seed(s) (identified at block 306), and (C) at least some of the cross-attention maps (identified at block 306).

In some implementations, block 308 includes sub-block 308A in which the system uses only a subset of the cross-attention maps and/or uses the cross-attention maps in only a subset of iterations of the processing. In some versions of those implementations, whether or which subset of the cross-attention maps are utilized can be dependent on the edit to the source NL prompt, that is reflected by the user interface input received at block 302. Further, in some of those versions or in other versions of those implementations, whether the cross-attention maps are applied in only a subset of the iterations and/or in which subset the cross-attention maps are applied can be dependent on the edit to the source NL prompt, that is reflected by the user interface input received at block 302. For example, where the edit is a replacement, only a subset of the cross-attention maps, that exclude those corresponding to replaced token(s), can be utilized and are only utilized in a subset of the iterations. As another example, where the edit is an addition, the cross-attention maps can optionally include all of the cross-attention maps, but they can be utilized only in a subset of the iterations (e.g., not utilized in processing feature(s) corresponding to replacement token(s). As yet another example, where the edit is an adjustment of emphasis on emphasis token(s), a first subset of the cross-attention maps can be utilized for non-emphasis token(s) and scaled versions of a second subset of the cross-attention maps can be utilized for emphasis token(s).

In some additional or alternative implementations, sub-block 308A can include the system always using the cross-attention map in only a subset of iterations of the processing, such as in only a threshold percentage of the iterations. For example, the threshold can be between 5% and 95%, between 15% and 90%, between 25% and 75%, or between other bound(s). Optionally, in some versions of those additional or alternative implementations, the interactive user interface element(s) can be presented that enable user input to define the fidelity, to the original image, that should be adhered to in generating the edited image. In some of those versions, the threshold can be determined by the system based on interaction(s) with the user interface element(s).

At block 310, the system causes rendering of the edited image and, optionally, of the edited NL prompt. For example, the system can cause such rendering at a client device that provided the user interface input of block 302.

At optional block 312, the system can monitor for new user interface input that indicates a further edit to the source NL prompt, and that is in addition to edit(s) of prior iteration(s) of block 302. If such new user interface input is detected, the system can proceed to perform another iteration of block 302, 304, 306, 308, and 310 based on such new user interface input.

Figure 4:
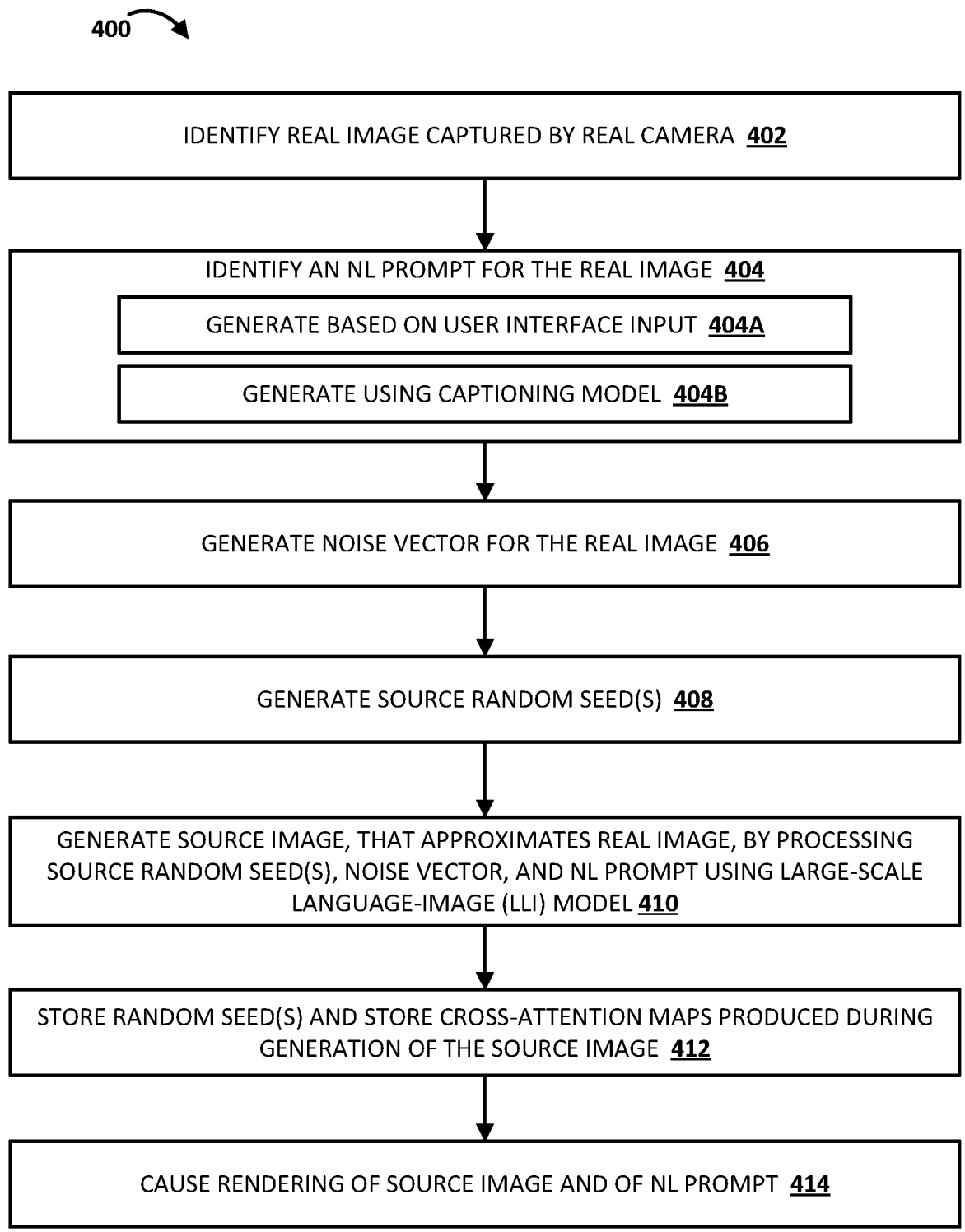
FIG. 4 illustrates an example method of generating a source image, that approximates a real image, by processing, using an LLI model, a natural language prompt for the real image and a noise vector for the real image, and storing random seed(s) used in the processing and cross-attention maps produced in the processing.

FIG. 4 illustrates an example method 400 of generating a source image, that approximates a real image, by processing, using an LLI model, a natural language prompt for the real image and a noise vector for the real image, and storing random seed(s) used in the processing and cross-attention maps produced in the processing. For convenience, the operations of the flow chart are described with reference to a system that performs the operations. This system can include various components of various computer systems, such as one or more components of server computing device(s). Moreover, while operations of method 400 are shown in a particular order, this is not meant to be limiting. One or more operations can be reordered, omitted or added.

At block 402, the system identifies a real image captured by a real camera, such a real image uploaded from a client device.

At block 404, the system identifies an NL prompt for the real image. In identifying the NL prompt for the real image, the system can perform sub-block 404A or sub-block 404B.

At sub-block 404A, the NL prompt for the real image is generated based on user interface input. For example, when the real image is received from the client device at block 402, the NL prompt can also be received and can be responsive to user interface input received at the client device. For instance, the user interface input can be received, at the client device, responsive to rendering a prompt such as a prompt of "please provide a natural language description of this image".

At sub-block 404B, the NL prompt for the real image is generated based on processing the real image using a captioning model or other visual language model.

At block 406, the system generates a noise vector for the real image. For example, the system can generate the noise vector based on applying an inversion process to the real image, such as a DDIM or DDPM inversion process.

At block 408, the system generates one or more source random seeds. For example, the system can use a random or pseudo-random process to generate the source random seed(s).

At block 410, the system generates a source image, that approximates the real image, by processing the source random seed(s) of block 408, the noise vector of block 406, and the NL prompt of block 404, using an LLI model. In generating the source image based on such processing using the LLI model, cross-attention maps are produced as described herein. The cross-attention maps can include values that bind tokens of the NL prompt to pixels of the generated source image.

At block 412, the system stores (e.g., at least temporarily in memory) the random seed(s) of block 408 and the cross-attention maps produced during the generation of the source image at block 410.

At optional block 414, the system causes rendering of the source image and/or of the NL prompt 210. For example, the system can cause such rendering at a client device that provided the real image of block 402.

Figure 5:
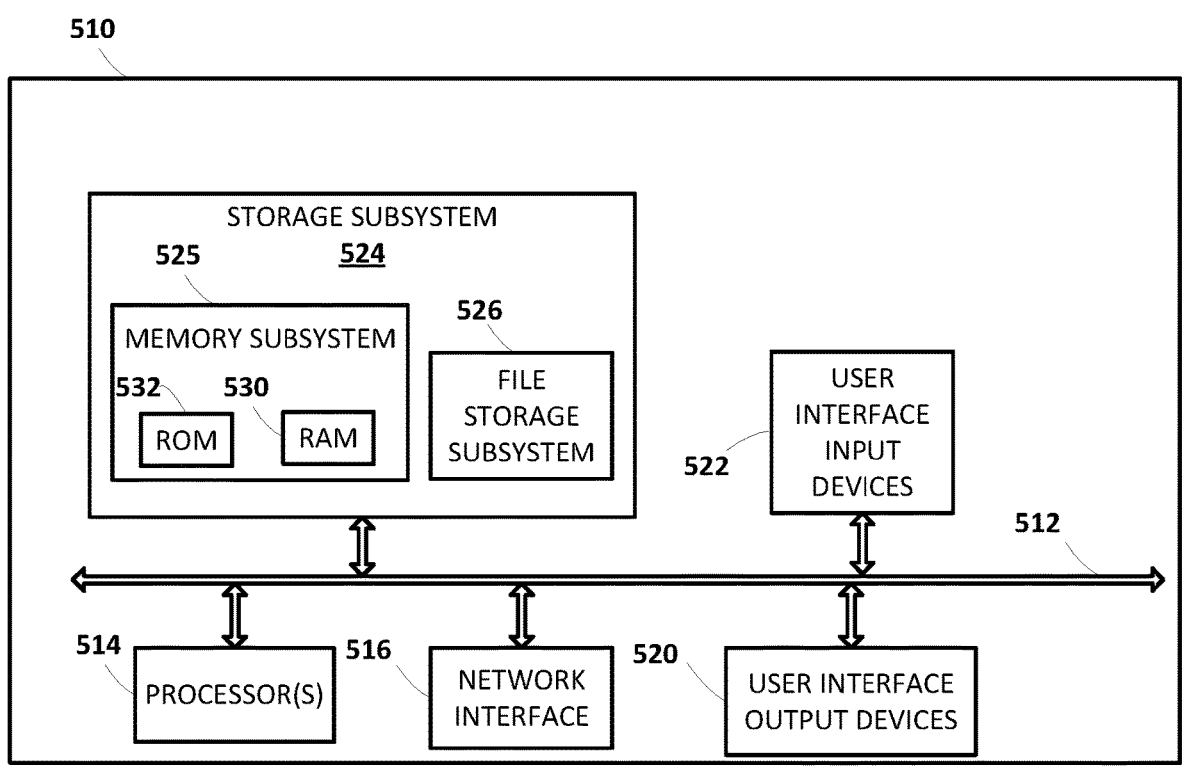
FIG. 5 schematically illustrates an example computer architecture on which selected aspects of the present disclosure can be implemented.

FIG. 5 is a block diagram of an example computing device 510 that can optionally be utilized to perform one or more aspects of techniques described herein. For example, all or aspects of computing device 510 can be incorporated in server(s) or other computing device(s) that are utilized to implement prompt-to-prompt editing techniques disclosed herein.

Computing device 510 typically includes at least one processor 514 which communicates with a number of peripheral devices via bus subsystem 512. These peripheral devices can include a storage subsystem 524, including, for example, a memory subsystem 525 and a file storage subsystem 526, user interface output devices 520, user interface input devices 522, and a network interface subsystem 516. The input and output devices allow user interaction with computing device 510. Network interface subsystem 516 provides an interface to outside networks and is coupled to corresponding interface devices in other computing devices.

User interface input devices 522 can include a keyboard, pointing devices such as a mouse, trackball, touchpad, or graphics tablet, a scanner, a touch screen incorporated into the display, audio input devices such as voice recognition systems, microphones, and/or other types of input devices. In general, use of the term "input device" is intended to include all possible types of devices and ways to input information into computing device 510 or onto a communication network.

User interface output devices 520 can include a display subsystem, a printer, a fax machine, or non-visual displays such as audio output devices. The display subsystem can include a cathode ray tube (CRT), a flat-panel device such as a liquid crystal display (LCD), a projection device, or some other mechanism for creating a visible image. The display subsystem can also provide non-visual display such as via audio output devices. In general, use of the term "output device" is intended to include all possible types of devices and ways to output information from computing device 510 to the user or to another machine or computing device.

Storage subsystem 524 stores programming and data constructs that provide the functionality of some or all of the modules described herein. For example, the storage subsystem 524 can include the logic to perform selected aspects of the methods of FIGS. 2, 3, and/or 4, as well as to implement various components described herein.

These software modules are generally executed by processor 514 alone or in combination with other processors. Memory 525 used in the storage subsystem 524 can include a number of memories including a main random-access memory (RAM) 530 for storage of instructions and data during program execution and a read only memory (ROM) 532 in which fixed instructions are stored. A file storage subsystem 526 can provide persistent storage for program and data files, and can include a hard disk drive, a floppy disk drive along with associated removable media, a CD-ROM drive, an optical drive, or removable media cartridges. The modules implementing the functionality of certain implementations can be stored by file storage subsystem 526 in the storage subsystem 524, or in other machines accessible by the processor(s) 514.

Bus subsystem 512 provides a mechanism for letting the various components and subsystems of computing device 510 communicate with each other as intended. Although bus subsystem 512 is shown schematically as a single bus, alternative implementations of the bus subsystem can use multiple busses.

Computing device 510 can be of varying types including a workstation, server, computing cluster, blade server, server farm, or any other data processing system or computing device. Due to the ever-changing nature of computers and networks, the description of computing device 510 depicted in FIG. 5 is intended only as a specific example for purposes of illustrating some implementations. Many other configurations of computing device 510 are possible having more or fewer components than the computing device depicted in FIG. 5.

While several implementations have been described and illustrated herein, a variety of other means and/or structures for performing the function and/or obtaining the results and/or one or more of the advantages described herein can be utilized, and each of such variations and/or modifications is deemed to be within the scope of the implementations described herein. More generally, all parameters, dimensions, materials, and configurations described herein are meant to be exemplary and that the actual parameters, dimensions, materials, and/or configurations will depend upon the specific application or applications for which the teachings is/are used. Those skilled in the art will recognize, or be able to ascertain using no more than routine experimentation, many equivalents to the specific implementations described herein. It is, therefore, to be understood that the foregoing implementations are presented by way of example only and that, within the scope of the appended claims and equivalents thereto, implementations can be practiced otherwise than as specifically described and claimed. Implementations of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the scope of the present disclosure.

In some implementations, a method implemented by processor(s) is provided and includes identifying source cross-attention maps that were produced using cross-attention layers, of a large-scale language-image (LLI) model, in generating a source image based on processing a source natural language (NL) prompt using the LLI model. The method further includes identifying one or more source random seeds that were utilized in generating the source image based on processing the source NL prompt using the LLI model. The method further includes, subsequent to generating the source image, receiving user interface input that indicates an edit to the source NL prompt that was used in generating the source image. The method further includes, in response to receiving the user interface input that indicates the edit to the source NL prompt, generating, in multiple iterations of processing using the LLI model, an edited image that is visually similar to the source image but that includes visual modifications consistent with the edit, to the NL prompt, indicated by the user interface input. Generating, in the iterations of processing using the LLI model, the edited image, can include: processing, in the iterations of processing using the LLI model: one or more features generated based on the edit to the source NL prompt, and the source random seeds; and injecting, in at least some of the iterations of generating the edited image using the LLI model, at least a portion of the source cross-attention maps.

These and other implementations of the technology disclosed herein can include one or more of the following features.

In some implementations, the edit includes a replacement, of a subset of tokens of the source NL prompt, with one or more replacement tokens that differ from the subset of tokens of the source NL prompt. In some versions of those implementations, the one or more features generated based on the edit to the source NL prompt include a text embedding of a modified prompt that conforms to the source NL prompt, but replaces the subset of tokens of the source NL prompt with the edited tokens. In some of those versions, injecting, in the at least some of the iterations of generating the edited image using the LLI model, at least a portion of the source cross-attention maps includes: using the entirety of the source cross-attention maps in processing the text embedding, of the modified prompt, in the at least some of the iterations. In some variants of those versions, the at least some of the iterations are a subset of the iterations and in other iterations, that are not included in the subset of the iterations, other cross-attention maps are utilized in processing the text embedding and the source cross-attention maps are not utilized in processing the text embedding. For example, the subset of the iterations can: be an initial continuous sequence of the iterations; includes more than five percent of the iterations, but less than ninety-five percent of the iterations; and/or includes more than ten percent of the iterations, but less than ninety percent of the iterations.

In some implementations, the edit includes an addition, of one or more additional tokens, to the source NL prompt. In some versions of those implementations, the one or more features generated based on the edit to the source NL prompt include a text embedding of a modified prompt that includes the source NL prompt and the additional tokens. In some variants of those versions, injecting, in at least some of the iterations of generating the edited image using the LLI model, at least a portion of the source cross-attention maps includes: using the entirety of the source cross-attention maps in processing a portion of the text embedding that corresponds to the source NL prompt, where the source cross-attention maps are not utilized in processing an additional portion of the text embedding that corresponds to the additional tokens. In some of those variants, the at least some of the iterations are a subset of the iterations and in other iterations, that are not included in the subset, the source cross-attention maps are not utilized in processing the portion of the text embedding that corresponds to the source NL prompt. For example, the subset of the iterations can be: an initial continuous sequence of the iterations; more than five percent of the iterations, but less than ninety-five percent of the iterations; and/or more than twenty percent of the iterations, but less than seventy-five percent of the iterations.

In some implementations, the edit includes an adjustment of emphasis on one or more emphasis tokens of the source tokens of the source NL prompt, the adjustment of emphasis being an increase or decrease of emphasis. In some versions of those implementations, the one or more features generated based on the edit to the source NL prompt include one or more scaled attention maps for the one or more emphasis tokens, and the method further includes: identifying an emphasis portion, of the source cross-attention maps, that corresponds to the one or more emphasis tokens; and generating the one or more scaled attention maps by scaling the emphasis portion in correspondence with the adjustment of emphasis. In some variants of those versions, the adjustment of emphasis is an increase of emphasis and generating the one or more scaled attention maps by scaling the emphasis portion in correspondence with the adjustment of emphasis includes increasing values of the emphasis portion by a factor. In some of those variants, the increase of emphasis, indicated by the user interface input, is of a particular magnitude that is one of multiple candidate degrees of magnitude and wherein the factor is proportional to the particular magnitude. Optionally, in some of the implementations that include an edit that is an adjustment of emphasis on emphasis token(s), a text embedding of the source NL prompt is processed in the iterations of processing using the LLI model, and the text embedding includes an emphasis embedding portion corresponding to the one or more emphasis tokens and a remaining portion embedding corresponding to a remainder of the source NL prompt after excluding the emphasis portion. Further, and optionally, the at least a portion of the source cross-attention maps is a remaining portion of the source cross-attention maps after excluding the emphasis portion and injecting, in the at least some of the iterations of generating the edited image using the LLI model, the at least a portion of the source cross-attention maps includes: using, in the at least some of the iterations, the remaining portion of the source cross-attention maps in processing the remaining portion embedding, where the one or more scaled source cross-attention maps are utilized in processing the emphasis embedding portion in the at least some of the iterations.

In some implementations, the at least some of the iterations are all of the iterations.

In some implementations, the cross-attention maps include values that bind tokens of the NL prompt to pixels of the source image. In some of those implementations, the values each define a corresponding weight, of a corresponding token of the tokens, on a corresponding pixel of the pixels.

In some implementations, the method further includes generating the source image based on processing the source natural language (NL) prompt using the LLI model.

In some implementations, the user interface input that indicates the edit to the source NL prompt includes typed input and/or an interaction with a graphical user interface that renders the source NL prompt. In some versions of those implementations, the edit includes an adjustment of emphasis on one or more emphasis tokens of the source tokens of the source NL prompt, the adjustment of emphasis being an increase or decrease of emphasis. In some of those versions, the user interface input includes the interaction with the graphical user interface and the interaction includes interaction with a slider that corresponds to the one or more emphasis tokens.

In some implementations, the user interface input that indicates the edit to the source NL prompt includes spoken input that is captured in audio data. In some of those implementations, the method further includes: processing the audio data, using an automatic speech recognition model, to generate recognized text that corresponds to the spoken input; and processing the recognized text to determine the edit to the source NL prompt.

In some implementations a method implemented by processor(s) is provided and includes identifying a real image captured by a real camera and identifying a natural language (NL) caption for the real image. The method further includes generating, using an inversion process and based on the real image, a noise vector for the real image. The method further includes processing, using a large-scale language-image (LLI) model and the noise vector, the NL caption to generate a source image that approximates the real image. The method further includes identifying source cross-attention maps that were produced using cross-attention layers, of the LLI model, in generating the source image. The method further includes identifying source random seeds that were utilized in generating the source image. The method further includes, subsequent to generating the source image, receiving user interface input that indicates an edit to the NL caption that was used in generating the source image. The method further includes, in response to receiving the user interface input that indicates the edit to the NL caption: generating, in multiple iterations of processing using the LLI model, an edited image that is visually similar to the source image but includes visual modifications consistent with the edit, to the NL caption, indicated by the user interface input. Generating, in the multiple iterations of processing using the LLI model, the edited image, can include processing, in the iterations of processing using the LLI model: one or more features generated based on the edit to the source NL caption, and the source random seeds; and injecting, in at least some of the iterations of generating the edited image using the LLI model, at least a portion of the source cross-attention maps.

These and other implementations of the technology disclosed herein can include one or more of the following features.

In some implementations, the NL caption for the real image is generated based on other user interface input.

In some implementations, the NL caption for the real image is automatically generated based on processing the real image using an additional model trained to predict captions for images.

In some implementations, the inversion process includes using a deterministic denoising diffusion implicit model (DDIM).

Other implementations can include a non-transitory computer readable storage medium storing instructions executable by one or more processor(s) (e.g., a central processing unit(s) (CPU(s)), graphics processing unit(s) (GPU(s)), and/or tensor processing unit(s) (TPU(s))) to perform a method such as one or more of the methods described herein. Yet other implementations can include a system of one or more computers that include one or more processors operable to execute stored instructions to perform a method such as one or more of the methods described herein.

We claim:

1. A method implemented by one or more processors, the method comprising:
    identifying source cross-attention maps that were produced using cross-attention layers, of a large-scale language-image (LLI) model, in generating a source image based on processing a source natural language (NL) prompt using the LLI model;
    identifying one or more source random seeds that were utilized in generating the source image based on processing the source NL prompt using the LLI model;
    subsequent to generating the source image:
        receiving user interface input that indicates an edit to the source NL prompt that was used in generating the source image;
    in response to receiving the user interface input that indicates the edit to the source NL prompt:
        generating, in multiple iterations of processing using the LLI model, an edited image that is visually similar to the source image but that includes visual modifications consistent with the edit, to the NL prompt, indicated by the user interface input, wherein generating, in the iterations of processing using the LLI model, the edited image, comprises:
            processing, in the iterations of processing using the LLI model:
                one or more features generated based on the edit to the source NL prompt, and
                the source random seeds, and
            injecting, in at least some of the iterations of generating the edited image using the LLI model, at least a portion of the source cross-attention maps.

2. The method of claim 1, wherein the edit comprises a replacement, of a subset of tokens of the source NL prompt, with one or more replacement tokens that differ from the subset of tokens of the source NL prompt.

3. The method of claim 2, wherein the one or more features generated based on the edit to the source NL prompt comprise a text embedding of a modified prompt that conforms to the source NL prompt, but replaces the subset of tokens of the source NL prompt with the one or more replacement tokens.

4. The method of claim 3, wherein injecting, in the at least some of the iterations of generating the edited image using the LLI model, at least a portion of the source cross-attention maps comprises:
using the entirety of the source cross-attention maps in processing the text embedding, of the modified prompt, in the at least some of the iterations.

5. The method of claim 4, wherein the at least some of the iterations are a subset of the iterations and wherein in other iterations, that are not included in the subset of the iterations, other cross-attention maps are utilized in processing the text embedding and the source cross-attention maps are not utilized in processing the text embedding.

6. The method of claim 5, wherein the subset of the iterations is an initial continuous sequence of the iterations.

7. The method of claim 5, wherein the subset of the iterations comprises more than five percent of the iterations, but less than ninety-five percent of the iterations.

8. The method of claim 1, wherein the edit comprises an addition, of one or more additional tokens, to the source NL prompt.

9. The method of claim 8, wherein the one or more features generated based on the edit to the source NL prompt comprise a text embedding of a modified prompt that includes the source NL prompt and the additional tokens.

10. The method of claim 9, wherein injecting, in at least some of the iterations of generating the edited image using the LLI model, at least a portion of the source cross-attention maps comprises:
using the entirety of the source cross-attention maps in processing a portion of the text embedding that corresponds to the source NL prompt, wherein the source cross-attention maps are not utilized in processing an additional portion of the text embedding that corresponds to the additional tokens.

11. The method of claim 10, wherein the at least some of the iterations are a subset of the iterations and wherein in other iterations, that are not included in the subset, the source cross-attention maps are not utilized in processing the portion of the text embedding that corresponds to the source NL prompt.

12. The method of claim 11, wherein the subset of the iterations comprises more than five percent of the iterations, but less than ninety-five percent of the iterations.

13. The method of claim 1, wherein the edit comprises an adjustment of emphasis on one or more emphasis tokens of the source tokens of the source NL prompt, the adjustment of emphasis being an increase or decrease of emphasis.

14. The method of claim 13, wherein the one or more features generated based on the edit to the source NL prompt comprise one or more scaled attention maps for the one or more emphasis tokens, and further comprising:
identifying an emphasis portion, of the source cross-attention maps, that corresponds to the one or more emphasis tokens; and
generating the one or more scaled attention maps by scaling the emphasis portion in correspondence with the adjustment of emphasis.

15. The method of claim 14, wherein the adjustment of emphasis is the increase of emphasis and wherein generating the one or more scaled attention maps by scaling the emphasis portion in correspondence with the adjustment of emphasis comprises:
increasing values of the emphasis portion by a factor.

16. The method of claim 15, wherein the increase of emphasis, indicated by the user interface input, is of a particular magnitude that is one of multiple candidate degrees of magnitude and wherein the factor is proportional to the particular magnitude.

17. The method of claim 14, wherein a text embedding of the source NL prompt is processed in the iterations of processing using the LLI model, and wherein the text embedding comprises an emphasis embedding portion corresponding to the one or more emphasis tokens and a remaining portion embedding corresponding to a remainder of the source NL prompt after excluding the emphasis portion.

18. The method of claim 17, wherein the at least a portion of the source cross-attention maps is a remaining portion of the source cross-attention maps after excluding the emphasis portion and wherein injecting, in the at least some of the iterations of generating the edited image using the LLI model, the at least a portion of the source cross-attention maps comprises:
using, in the at least some of the iterations, the remaining portion of the source cross-attention maps in processing the remaining portion embedding, wherein the one or more scaled source cross-attention maps are utilized in processing the emphasis embedding portion in the at least some of the iterations.

19. The method of claim 1, further comprising:
generating the source image based on processing the source natural language (NL) prompt using the LLI model.

20. A method implemented by one or more processors, the method comprising:
identifying a real image captured by a real camera;
identifying a natural language (NL) caption for the real image;
generating, using an inversion process and based on the real image, a noise vector for the real image;
processing, using a large-scale language-image (LLI) model and the noise vector, the NL caption to generate a source image that approximates the real image;
identifying source cross-attention maps that were produced using cross-attention layers, of the LLI model, in generating the source image;
identifying source random seeds that were utilized in generating the source image;
subsequent to generating the source image:
receiving user interface input that indicates an edit to the NL caption that was used in generating the source image;
in response to receiving the user interface input that indicates the edit to the NL caption:
generating, in multiple iterations of processing using the LLI model, an edited image that is visually similar to the source image but includes visual modifications consistent with the edit, to the NL caption, indicated by the user interface input, wherein generating, in the multiple iterations of processing using the LLI model, the edited image, comprises:
processing, in the iterations of processing using the LLI model:
one or more features generated based on the edit to the source NL caption, and
the source random seeds, and
injecting, in at least some of the iterations of generating the edited image using the LLI model, at least a portion of the source cross-attention maps.

* * * * *